(12) United States Patent
Rubin

(10) Patent No.: US 9,636,572 B2
(45) Date of Patent: May 2, 2017

(54) MULTI-CAM BASED FORMATTED ONLINE INFORMATION SHARING SYSTEM AND METHOD

(76) Inventor: Marcia Rubin, Lincolnwood, IL (US)

( * ) Notice: Subject to any disclaimer, the term of this patent is extended or adjusted under 35 U.S.C. 154(b) by 259 days.

(21) Appl. No.: 14/128,479

(22) PCT Filed: Jun. 11, 2012

(86) PCT No.: PCT/US2012/041867
§ 371 (c)(1),
(2), (4) Date: Dec. 20, 2013

(87) PCT Pub. No.: WO2012/177432
PCT Pub. Date: Dec. 27, 2012

(65) Prior Publication Data
US 2014/0141851 A1   May 22, 2014

Related U.S. Application Data

(60) Provisional application No. 61/500,512, filed on Jun. 23, 2011.

(51) Int. Cl.
*A63F 13/00* (2014.01)
*A63F 13/30* (2014.01)
(Continued)

(52) U.S. Cl.
CPC ............ *A63F 13/12* (2013.01); *A63F 13/352* (2014.09); *A63F 13/80* (2014.09); *A63F 13/87* (2014.09); *H04L 12/185* (2013.01); *H04L 12/1818* (2013.01); *A63F 2300/513* (2013.01); *A63F 2300/556* (2013.01); *A63F 2300/572* (2013.01); *A63F 2300/8064* (2013.01); *H04L 12/1822* (2013.01)

(58) Field of Classification Search
CPC ...... A63F 13/87; A63F 13/213; A63F 13/795; A63F 2300/556; A63F 2300/572; A63F 2300/8064; A63F 13/12; A63F 13/30–13/35; A63F 13/8087; A63F 2300/40–2300/51; A63F 2300/69; A63F 2300/695; A63F 2300/5553; H04L 67/104; H04L 67/1091
See application file for complete search history.

(56) References Cited

U.S. PATENT DOCUMENTS 5,695,400 A * 12/1997 Fennell, Jr. ............. A63F 13/12
                                                            463/42
6,267,379 B1 * 7/2001 Forrest .................... A63F 9/183
                                                            273/431
(Continued)

FOREIGN PATENT DOCUMENTS

EA         005914      6/2005
WO    WO 2004014050    2/2004

OTHER PUBLICATIONS

International Bureau of WIPO, "International Preliminary Report on Patentability", mailed Jan. 9, 2014.
(Continued)

*Primary Examiner* — Steven J Hylinski
(74) *Attorney, Agent, or Firm* — Neymeyer-Tynkov LLC

(57) ABSTRACT

Multi-cam based formatted online information sharing systems and methods that provide real-time interpersonal communication are described.

21 Claims, 3 Drawing Sheets

(51) Int. Cl.
  *A63F 13/352*  (2014.01)
  *A63F 13/80*   (2014.01)
  *A63F 13/87*   (2014.01)
  *H04L 12/18*   (2006.01)

(56) References Cited

U.S. PATENT DOCUMENTS

| | | | | |
|---|---|---|---|---|
| 6,377,781 | B1* | 4/2002 | Mishkin | G09B 7/073 |
| | | | | 434/307 R |
| 6,458,060 | B1 | 10/2002 | Watterson et al. | |
| 6,763,226 | B1 | 7/2004 | McZeal, Jr. | |
| 7,478,129 | B1* | 1/2009 | Chemtob | H04L 12/1827 |
| | | | | 709/204 |
| 7,558,797 | B2* | 7/2009 | Li | G06F 17/301 |
| 8,684,807 | B1* | 4/2014 | Crici | A63F 13/795 |
| | | | | 434/322 |
| 8,938,677 | B2* | 1/2015 | Geppert | G06F 3/04817 |
| | | | | 348/14.08 |
| 9,158,444 | B2* | 10/2015 | Boyer | G06F 3/0488 |
| 9,294,291 | B2* | 3/2016 | Pegg | H04L 67/1091 |
| 9,325,786 | B2* | 4/2016 | Chan | H04L 67/104 |
| 2002/0002586 | A1* | 1/2002 | Rafal | G06Q 10/107 |
| | | | | 709/205 |
| 2002/0034980 | A1* | 3/2002 | Lemmons | A63F 3/081 |
| | | | | 463/40 |
| 2002/0196746 | A1* | 12/2002 | Allen | H04L 12/1822 |
| | | | | 370/260 |
| 2003/0071419 | A1* | 4/2003 | Stuart | A63F 9/18 |
| | | | | 273/430 |
| 2003/0114224 | A1* | 6/2003 | Anttila | A63F 13/12 |
| | | | | 463/40 |
| 2003/0227479 | A1* | 12/2003 | Mizrahi | A63F 13/10 |
| | | | | 715/753 |
| 2004/0017044 | A1* | 1/2004 | Smith | A63F 9/18 |
| | | | | 273/432 |
| 2006/0058103 | A1 | 3/2006 | Danieli et al. | |
| 2007/0005804 | A1 | 1/2007 | Rideout | |
| 2007/0162569 | A1* | 7/2007 | Robinson | H04L 12/1818 |
| | | | | 709/219 |
| 2007/0202937 | A1* | 8/2007 | Peires | A63F 1/00 |
| | | | | 463/9 |
| 2008/0059580 | A1* | 3/2008 | Kalinowski | G06Q 10/107 |
| | | | | 709/204 |
| 2008/0070697 | A1* | 3/2008 | Robinson | A63F 13/12 |
| | | | | 463/42 |
| 2008/0146342 | A1* | 6/2008 | Harvey | A63F 13/10 |
| | | | | 463/42 |
| 2009/0005141 | A1* | 1/2009 | Lehtiniemi | A63F 13/12 |
| | | | | 463/9 |
| 2011/0053689 | A1* | 3/2011 | Cohen | H04L 12/1818 |
| | | | | 463/31 |
| 2011/0237318 | A1* | 9/2011 | Sama | G07F 17/3225 |
| | | | | 463/9 |
| 2011/0252340 | A1* | 10/2011 | Thomas | G06Q 10/107 |
| | | | | 715/756 |
| 2012/0044319 | A1* | 2/2012 | Thompson | A63F 13/12 |
| | | | | 348/14.07 |
| 2012/0284651 | A1* | 11/2012 | Khan | A63F 13/12 |
| | | | | 715/758 |
| 2013/0210514 | A1* | 8/2013 | Nguyen | G07F 17/3225 |
| | | | | 463/16 |
| 2013/0216206 | A1* | 8/2013 | Dubin | H04N 7/155 |
| | | | | 386/282 |

OTHER PUBLICATIONS

ISA, Russian: "International Search Report" and "Written Opinion" mailed Sep. 20, 2012 in International Application No. PCT/US2012/041867.

* cited by examiner

MULTI-CAM BASED FORMATTED ONLINE INFORMATION SHARING SYSTEM AND METHOD

CROSS-REFERENCE TO RELATED APPLICATIONS

This application is a national stage completion application of PCT application Ser. No. PCT/US2012/041867, filed Jun. 11, 2012, which claims priority from U.S. Provisional Application No. 61/500,512, filed Jun. 23, 2011. Each of these applications is incorporated by reference with regard to all of its parts herein.

BACKGROUND OF THE INVENTION

There are many online games that can be played using a computer system coupled to a communication network (e.g., the Internet). These games may include traditional games of chance, games of skill, and casino-type games, among others. However, these games do not offer real-time interpersonal communication among participants.

As can be seen, there is a need for an online game that may offer real-time interpersonal communication among participants.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, an embodiment of the present invention generally provides an internet based multi-cam question and answer system and method for entertainment, socialization, and exchange of information.

Opposite Sex Challenge (OSC) is a competitive formatted online information sharing session that may be played like a "game show" where men and woman may meet up to find out who knows more about the opposite sex. The OSC may also provide basic online social networking functionality, like a private login, chatting, adding friends to a friend's list and exchanging private messages with other users. The OSC may allow webcam users to interact in a game format that features multiple-choice questions. It should be noted that in this disclosure a "webcam user" represents a user whose webcam may be connected via a computing device to the internet. The OSC may combine the addictiveness of a highly competitive game, with the functionality of various social networking sites, This combination may provide a fun online gaming environment, while creating numerous advertising opportunities.

Figure 1:
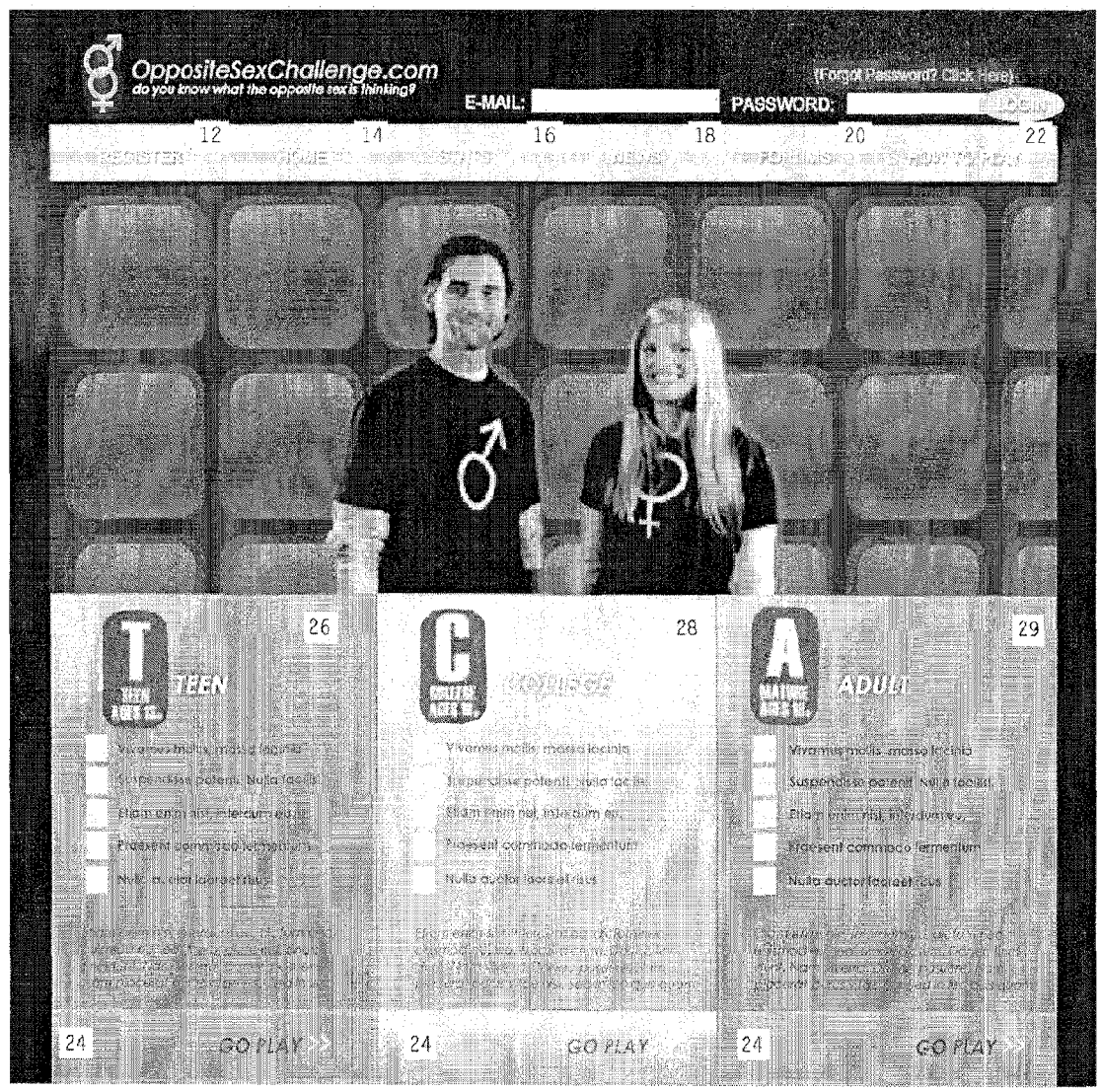
FIG. 1 is a top web page of a multi-cam based formatted online information sharing system and method according to an embodiment of the present invention.
Figure 2:
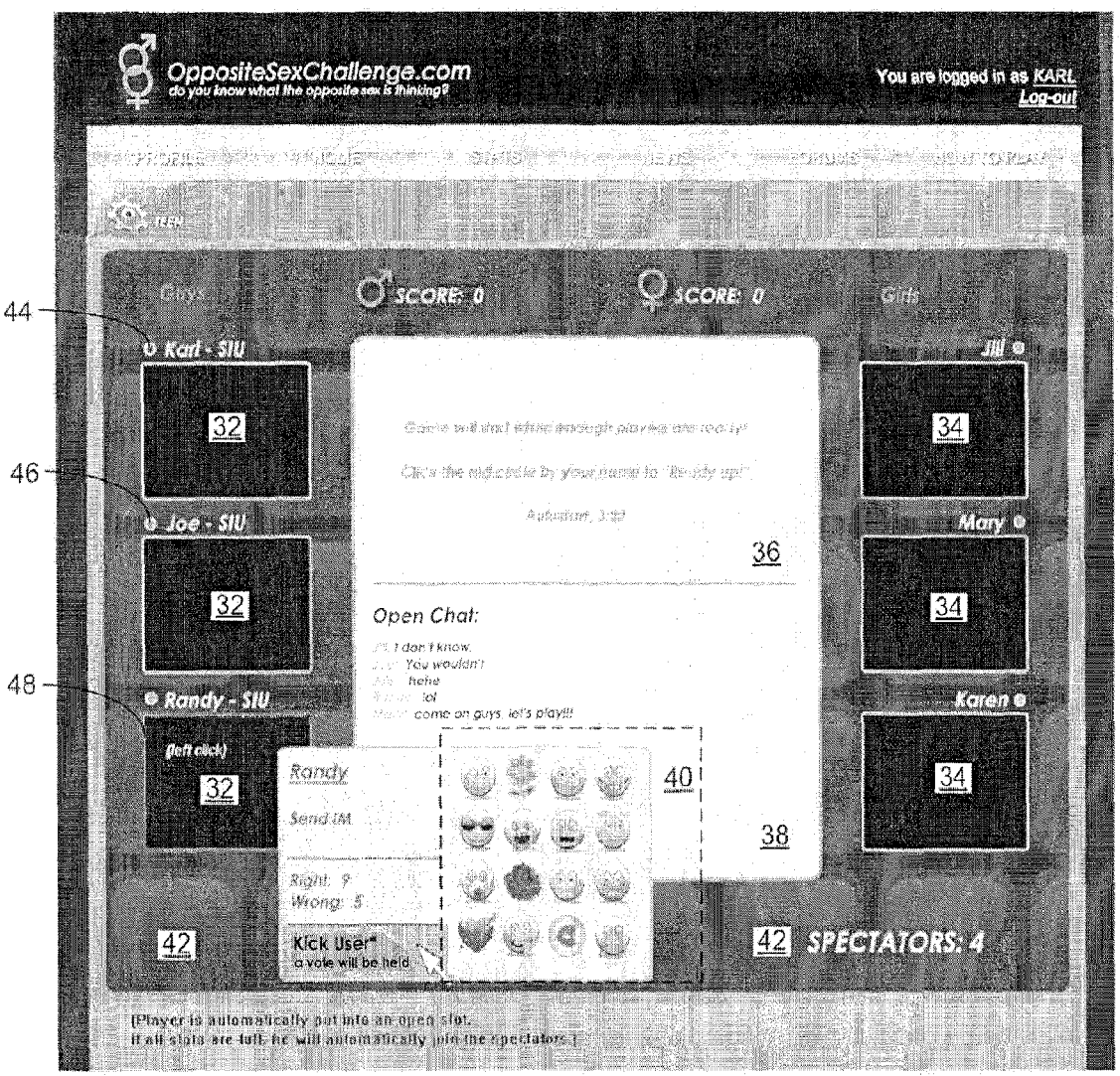
FIG. 2 is a game page of the formatted online information sharing system and method of FIG. 1.
Figure 3:
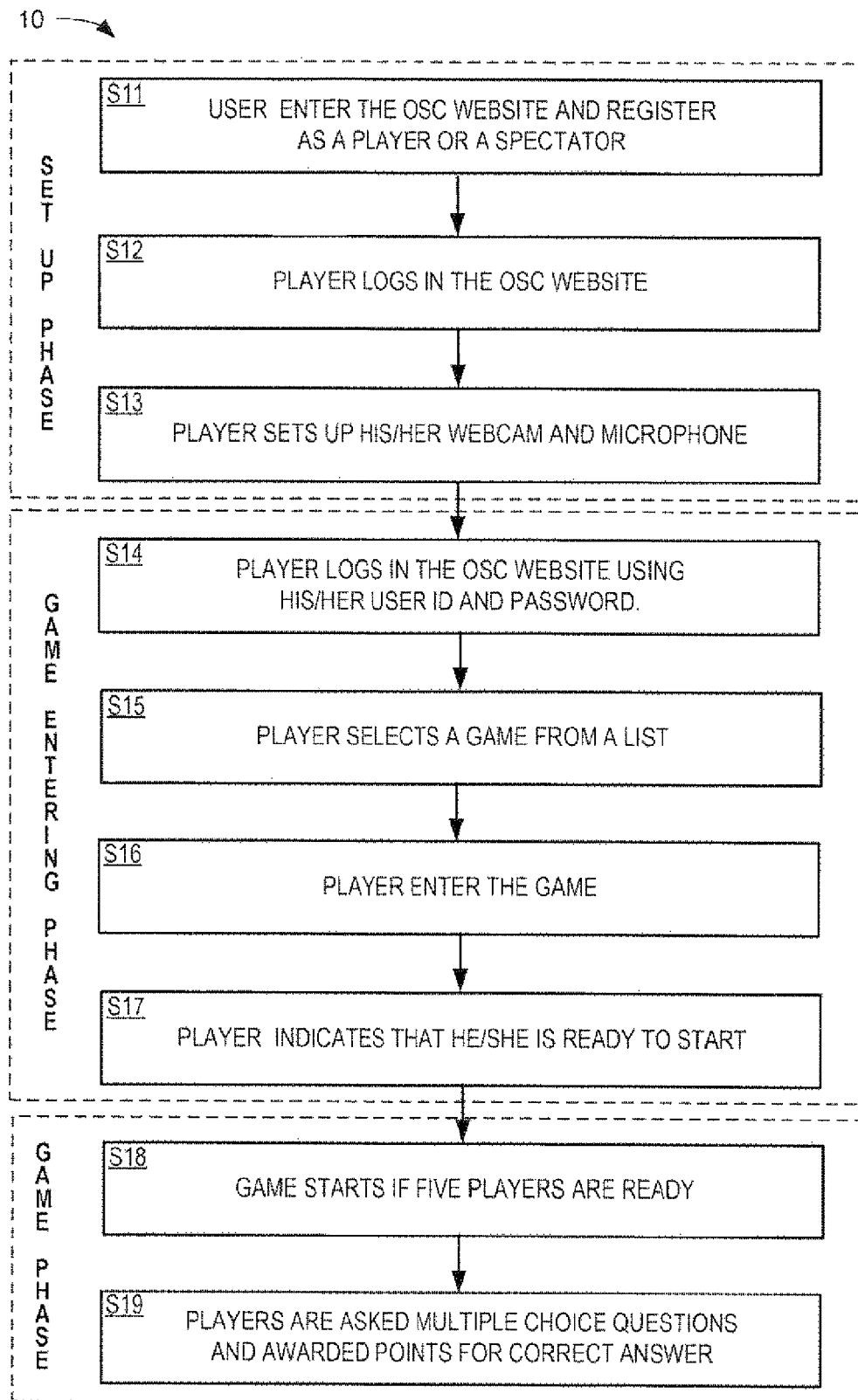
FIG. 3 is a flow chart illustrating the formatted online information sharing method of FIG. 1.

Referring now to FIGS. 1 and 2, different web pages of the "Opposite Sex Challenge" are shown according to an exemplary embodiment of the present invention. The system may include a question, answer tool facilitating an internet based method that may allow 2 to 6 webcam user participants to compete in a question, and answer formatted game. Spectators may also join the group with or without joining the conversation. A database server may store and retrieve questions and answers and also may store information about players, spectators, game rooms, and the actual game. A web server capable of retrieving information from the database server may send it to each player. A streaming server may provide a website that may allow communication between the players via peer-to-peer connection, The website may provide a number of pages during a game section. A top-page 11 may be provided where a client may login. There may be three age categories available for a user, a teen 26, a college 28 and an adult 29 age category. The top-page 11 may include a flash introduction video that may be played to introduce the site and show exactly how the 080 may be played. A set of buttons may be displayed at the top of the top-page 11 and on every page. The set of buttons may include a registration button 12, a home button 14, a statistics button 16, a news button 18, a forums button 20, and a "how to play" button 22. The registration button 12 may facilitate user registration. which may be a prerequisite to accessing the site, Registration information may include the user's age, the user's birthday, or the like. This information may be used to assign users to a teen, a college or an adult category. The user may receive a confirmation e-mail, which may activate his/her account and may enable the user to login with his/her username and password. The statistics button 16 may show statistics of all the players, such as, how many answers a player answered right and wrong, There may also be a leader board to show top players ranked from top to bottom and a search tool where you may look up other player's name and statistics. The statistics may not only display personal records, but also wins and losses of a team. By clicking on a player's name his/her profile page may be viewed by all users and may be edited by the profile owner. The profile page may allow for personal chatting, webcam chatting, viewing a player's personal statistics and photos. The profile page may also allow for adding a player to a friend's list. The friend might receive an invitation and he/she may either accept or decline that invitation. The news button 18 may display updates made to the site and changes that may affect game play. The forums button 20 may allow the user to post a site suggestion, a bug report and may provide a general discussion area about the game. The "how to play" button 22 may work as an online game manual. A "go play" button 24 may open a game page 30. The game page 30 may include mbox 32 for a male participant and f box 34 for a female participant. A video of the participant may animate his/her box 32/34. An indicator symbol 44/46 may be associated with each of the boxes 32/24. A red. light 44 may indicate the player is not ready, a green light may indicate the player is ready for the game. A game message area 36 may be used to display system messages/instructions, the latest question of the present round, a timer showing the time available for an answer and an indication for incorrect answer. A chat message area 38 may display instant messages sent by the players. An appreciation icon 40 may be sent and be attached to one of the mbox 32 or fbox 34 by a spectator via clicking on his/her spectator button 42 to express his/her sentiment towards a player's answer. The appreciation icons 40 may represent a wink, applause, laughing out loud, throwing a rose, and the like, A menu for "callvote" (not shown) may also be available to players near their mboxes'32 and fboxes' 34. A player may be kicked out from the game if at least four people vote for it. A player may be kicked out for various reasons, for example, hiding from the webcam, or being a male and playing on the female's side, Referring now to the FIG. 3, a flow chart of the formatted online information sharing method is shown. The method 10 may include actions performed by one or more players and the question and answer tool. The method 10 may include an initial set up phase, a game entering phase and a game phase.

The initial set up phase may start in step 11. In step 11, a user may enter the OSC website and may register as a player or a spectator. In step 12, the player may login. In step 13 the player may set up his/her webcam and microphone using the webpage provided onscreen initial setup video. The initial setup video may also include a microphone setup screen.

The game entering phase may start in step 14, in step 14 the player may login the OSC website using his/her user ID and password. In step 15 the player may select a game from a list of games "currently in progress". Information may also be provided, such as, how many players are in a game roam. There may also be an option to enter and be a spectator for a game currently in progress. In step 16, a player may enter the game, by double clicking on a game room icon. The player may automatically be placed into an open position on the side of his/her gender. Teams may be formed automatically through the use of a profile "tag". A player may add a "tag" to his/her own name. A statistics software tool may keep track of a team's tags. In step 17, the player may choose a ready icon next to his/her camera to indicate that he/she may be ready to start the game. Once five out of the six players are "readied up", the game may begin. If five out of the six players have not readied up, a countdown timer may start counting down for a predetermine time, for example, five minutes. After five minutes if there are still less than five players "readied up" the countdown timer may restart.

The game phase may automatically start in step 18, once five out of the six players click the "ready" button. In step 19, the players may be asked multiple choice questions and may be awarded points for correct answers. Points may be accumulated and prizes may be awarded accordingly. The teams may alternate answering. A red box 48 may be turned on highlighting the player who may be up next. Points may be tallied to the team's total score. There may be six rounds in the game; each round may have six questions. The team with the lower score may start the next round, if a player gives a correct answer, his/her team goes again and points may be doubled in the round. Once a question is missed, the other team may get to go. Once the question is missed by both sides, the round may be over. The team with the highest score at the end of the sixth round may be declared to be the winner. During the game any player may quit. A new player may join if there are less than six players playing. Statistics may be recorded for every game. Individual statistics for each player may also be recorded allowing a returning player to check his/her progress.

The disclosed system and method may allow webcam users to participate in corporate question and answer focus groups.

The question and answer tool may be used as a game application, an educational application, a corporate information and marketing tool.

It should be understood, of course, that the foregoing relates to exemplary embodiments of the invention and that modifications may be made without departing from the spirit and scope of the invention as set forth in the following claims.

What is claimed is:

1. A multi-webcam based question-and-answer formatted online information sharing method, comprising the steps of:
   a first webcam user providing input to a programmed computing device via one or more input devices, wherein the computing device comprises a processor, a display device, one or more input devices, a webcam and microphone, and non-transitory memory containing instructions that, when executed, cause the computing device to perform the steps of:
   registering the user on a website hosted by a web server to participate in a multi-webcam based question-and-answer formatted online information sharing session;
   logging the user into the website;
   configuring the user's webcam and microphone;
   selecting a multi-webcam based question-and-answer formatted online information sharing session for the user to enter;
   entering the user in the selected formatted information sharing session, said user automatically placed in one of two teams;
   displaying a graphical user interface on display device of the computing device said graphical user interface comprising a game page having
      real-time audio and visual images of the webcam user sourced from the webcam and microphone of the webcam user as well as audio and visual images of every other webcam user entered in the online information sharing session, sourced from each webcam user's respective webcam and microphone,
      a game message area displaying information sharing session instructions, questions, answers, and/or information, provided by a database server and
      a chat message area for displaying written messages between webcam users;
   indicating the webcam user is ready to participate real-time in the session; and
   participating real-time in the selected formatted information sharing session displayed on the game page with real-time visual and audio communication with computing devices of other webcam users entered in the session provided by a streaming server;
   wherein at least one other webcam user provides input to another programmed computing device, which logs the user into the website; enters the user into the information sharing session, said user automatically placed in the other team; displays the game page; indicates the user as ready to participate real-time6pin the information sharing session; and participates in the selected formatted information sharing session with said streaming server providing real-time visual and audio communication between computing devices of webcam users on the game page;
   wherein the selected formatted information sharing session:
   is competitive, includes 2-6 webcam users in total, sorted into 2 teams, and
   is formatted on the game page like a game show but without a live game show host; and
   wherein during the information sharing session:

(i.) the game message area displays a question from the database server and the game pane specifies the computing device of one webcam user to answer the question and then (ii.) the game message area displays the answer provided by the computing device of the specified webcam user, indicates the answer as correct or incorrect via input from the database server, displays the correct answer, and awards one or more points to the computing device of the answering webcam user and/or of said user's team for a correct answer;

with the game page displaying real-time visual audio discussion of the question and/or answer between the webcam users;

wherein throughout the information sharing session method;

the database server stores and retrieves questions answers, and session specific information, the web server retrieves information from the database server and sends questions and answers to the programmed computing device, and the streaming server provides visual and audio communication between the webcam users.

2. The method of claim 1, wherein said session includes at least 1 spectator, and said spectator may communicate with webcam user participants and/or other spectators in the chat message area.

3. The method of claim 1, wherein each webcam user participating in the session answers 1-3 questions, a score is calculated for each team, and a winning team identified.

4. The method of claim 1, wherein during the multi-cam based question-and-answer formatted online information sharing session, multi-cam users compete to determine who knows more about the opposite sex.

5. The method of claim 1, said game page further comprising a voting menu allowing webcam users participating in the information sharing session to kick out a webcam user from the session, if at least 4 webcam users vote for it.

6. The method of claim 5, wherein said streaming server is adapted to provide communication between the webcam users via a peer-to-peer connection.

7. The method of claim 6, wherein said two teams are based on gender, and each webcam user participating in the information sharing session is automatically placed into an open position on a team of his/her gender.

8. The method of claim 5, said information sharing session further comprising a spectator that provides input to a programmed computing device having one or more input devices and that displays the game page.

9. The method of claim 8, further comprising an appreciation icon that may 6pbe attached to a webcam user's video image on the game page via input from the computing device of the spectator.

10. The method of claim 9, wherein said appreciation icon represents a wink, applause, laughing out loud, or a rose.

11. The method of, claim 1, wherein the information sharing session presents 6 rounds to the webcam users, each round displaying 6 questions.

12. A multi-webcam based question-and-answer formatted online information sharing system, comprising:

a website hosted by a web server and provided via a graphical user interface displayed on a computing device of a webcam user, wherein the computing device comprises a processor, a display device, one or more input devices, a webcam and microphone, and non-transitory memory containing instructions that, when executed, cause the computing device to:

log in the user for a. multi -webcam based question-and-answer formatted online information sharing session;

display the graphical user interface comprising a game page having real-time audio and visual images sourced from at least two internet connected webcams and microphones of at least two users being logged in to the website, and entered in an information sharing session, said game page further comprising a game message area displaying information sharing session instructions questions, answers, and/or information, provided by a database server, and a chat message area for displaying written messages between webcam users;

display a question in the game message area and specify the computing device of one webcam user to input an answer to the question; and then receiving the answer display the answer and award points for a correct answer;

said system further comprising a database server configured to store and retrieve questions, answers and other information sharing session specific information;

the web server configured for retrieving information from the database server and sending questions and answers to the at least one computing device of the user;

a streaming server adapted to provide communication between the users;

wherein said website, web cams, microphones, question-and-answer tool, database server, web server, and streaming server interact to provide the multi-webcam based question-and-answer formatted online information sharing session displayed at the game nap of the at least one computing device; and wherein the selected formatted information sharing session is competitive and arranged as a game show, without a show host, wherein the selected formatted information sharing session:

is competitive and has 2-6 webcam users in total, and is formatted on the game page like a game show, without a live game show host.

13. The system of claim 12, wherein said streaming server is adapted to provide communication between the users via a peer-to-peer connection.

14. The system of claim 12, wherein the question-and-answer tool provides a question about the male and/or female sex.

15. The system of claim 12, the game page further comprising a voting menu allowing webcam users participating in the information sharing session to kick out a webcam user from the session.

16. The system of claim 15, wherein said streaming server is adapted to provide communication between the webcam users via a peer-to-peer connection.

17. The system of claim 16, wherein said two teams are based on gender, and each webcam user participating in the information sharing session is automatically placed into an open position on a team of his/her gender.

18. The system of claim 15, said information sharing session further comprising a spectator that provides input to a programmed computing device having one or more input devices and that displays the game page.

19. The system of claim 18, further comprising an appreciation icon that may be attached to a webcam user's video image on the game page.

20. The system of claim 19, wherein said appreciation icon represents a wink, applause, laughing out loud, or a rose.

21. The system of claim 12, wherein the information sharing session presents 6 rounds to the webcam users, each round displaying 6 questions.

* * * * *